(12) United States Patent
Mizosoe et al.

(10) Patent No.: US 6,509,931 B1
(45) Date of Patent: Jan. 21, 2003

(54) RESOLUTION CONVERSION UNIT AND APPARATUS HAVING RESOLUTION CONVERSION UNIT

(75) Inventors: Hiroki Mizosoe, Kawasaki (JP); Hiroyasu Ohtsubo, Yokohama (JP); Hiroyuki Komatsu, Yokohama (JP)

(73) Assignees: Hitachi, Ltd., Tokyo (JP); Hitachi Video and Information System, Inc., Yokohama (JP)

( * ) Notice: Subject to any disclaimer, the term of this patent is extended or adjusted under 35 U.S.C. 154(b) by 0 days.

(21) Appl. No.: 09/522,366

(22) Filed: Mar. 9, 2000

(30) Foreign Application Priority Data

Jan. 11, 2000 (JP) .......................... 2000-006061

(51) Int. Cl.$^7$ .......................... H04N 7/01; H04N 11/20; H04N 9/74
(52) U.S. Cl. .......................... 348/458; 348/581; 345/668; 345/669
(58) Field of Search .......................... 348/458, 445, 348/441, 581, 582, 561, 562; 345/660, 667, 668, 669, 670, 671; 382/298; H04N 7/01, 11/20, 9/74

(56) References Cited

U.S. PATENT DOCUMENTS

| 3,976,982 | A | * | 8/1976 | Eiselen | .......................... 345/561 |
|---|---|---|---|---|---|
| 4,163,249 | A | * | 7/1979 | Michael et al. | .............. 348/580 |
| 4,394,693 | A | * | 7/1983 | Shirley | .......................... 346/3 |
| 4,774,581 | A | | 9/1988 | Shiratsuchi | |
| 5,020,115 | A | * | 5/1991 | Black | .......................... 358/451 |
| 5,172,103 | A | * | 12/1992 | Kita | .......................... 345/667 |
| 5,309,253 | A | * | 5/1994 | Ariga et al. | ................. 358/451 |
| 5,475,426 | A | * | 12/1995 | Kinugasa et al. | ......... 348/240.2 |
| 6,407,778 | B1 | * | 6/2002 | Shimizu et al. | .............. 345/668 |

* cited by examiner

Primary Examiner—Michael H. Lee
(74) Attorney, Agent, or Firm—Antonelli, Terry, Stout & Kraus, LLP

(57) ABSTRACT

The large circuit scale problem is avoided by applying a systematic algorithm for both enlargement and reduction. A resolution conversion unit for converting the resolution of an input video signal with a magnification of M/N is provided with a storage part for storing the arithmetic result, an arithmetic part having an adding part for adding a positive integer M to an output of the storage part and a subtracting part for subtracting a positive integer N from the output of the storage part, a memory part for temporarily storing a video signal, a memory control part for generating a reading and/or writing control signal based on an output supplied from the arithmetic part, and a pixel value arithmetic part for calculating an output pixel value corresponding to a pixel value included in an input video signal based on an output supplied from the arithmetic part.

15 Claims, 7 Drawing Sheets

RESOLUTION CONVERSION UNIT AND APPARATUS HAVING RESOLUTION CONVERSION UNIT

BACKGROUND OF THE INVENTION

1. Field of the Invention

This invention relates a resolution conversion unit and an apparatus that has the resolution conversion unit that are used for enlarging/reducing an image by converting the number of pixels of the input image.

The term "enlarging" means the increment of the number of pixels per one direction in the case that a specified picture is expressed on an screen, and on the other hand the term "reducing" means that decrement of the number of pixels per one direction in the case that a specified picture is expressed on an screen.

2. Related Art

The format (resolution) of the image signal has been diversified concomitantly with the appearance of the high-definition television and popularization of the computer that can process the image signal easily. It has been necessary that the receiver is rendered capable of enlarging or reducing an image so as to match with the indication given in the broadcast concomitantly with the diversification of the broadcasting service. Furthermore, it has been required that the image signal is exchanged between apparatuses having the different resolution concomitantly with realization of easy connection between apparatuses concomitantly with realization of digital apparatuses.

The resolution conversion of an image is described herein under.

The resolution conversion of an image and the enlargement/reduction of an image are an equivalent process in view of the conversion of the number of pixels. For example, a process in which an original image having a resolution composed of 720×480 pixels is converted to an image having a resolution composed of 1440×960 pixels is exemplified for description. The process involves doubling conversion of the number of pixels in both horizontal and vertical directions.

It is assumed that the image after conversion is projected on a screen having the same physical size as that of the image before conversion, then the process is regarded as the resolution conversion process because the number of pixels per unit length is doubled. On the other hand, it is assumed that the image after conversion is projected on a screen having the doubled physical size in both vertical and horizontal directions in comparison with the size of the screen on which the image before conversion is projected, then the process is regarded as the image enlargement process because the size of the image is doubled though the number of pixels per unit length is not converted.

Anyway, both processes are substantially equivalent in that an image composed of 720×480 pixels is converted into an image composed of 1440×960 pixels in the image process. Therefore, the resolution conversion of an image is not discriminated from the enlargement/reduction of an image hereinafter.

Various techniques have been proposed to realize the resolution conversion of the image signal, for example, U.S. Pat. No. 5,253,064 and U.S. Pat. No. 4,774,581 are proposed. These proposals are made to enlarge or reduce the image for an specified purpose, and do not intend the mutual conversion of the image having various resolution as described herein above, that is, do not intend the arbitrary enlargement and reduction by means of the systematic method.

In the conventional technique, it is required to use different algorithms for enlargement and reduction respectively in order to realize the arbitrary enlargement/reduction resolution conversion as described herein above. It is possible to provide respective hardware apparatuses exclusively used for these different algorithms. However, such structure is disadvantageous in that the large circuit scale is required. Though the hardware is partially commonly used for both enlargement and reduction with switching, the complicated control is required because different algorithms are used for enlargement and reduction respectively, and the partial common use of the hardware leads to a large circuit scale.

It is the object of the present invention to propose an algorithm that is capable of systematic both enlargement and reduction, and provides a resolution conversion unit and an apparatus having the resolution conversion unit that are capable of realizing the arbitrary enlargement/reduction with a relatively simple single hardware without the problem as described herein above by application of the algorithm.

SUMMARY OF THE INVENTION

To achieve the above-mentioned object, a resolution conversion unit in accordance with the present invention for converting the resolution of an input video signal with a magnification of M/N is provided with;

a storage means for storing the arithmetic result, an arithmetic means including an adding means for adding a positive integer M to an output of the storage means and a subtracting means for subtracting a positive integer N from the output of the storage means, a memory means for temporarily storing a video signal, a memory control means for generating a reading and/or writing control signal based on the output supplied from the arithmetic means, and a pixel value arithmetic means for calculating an output pixel value corresponding to the pixel value included in the input video signal based on the output supplied from the arithmetic means.

DETAILED DESCRIPTION OF THE PREFERRED EMBODIMENTS

Figure 1:
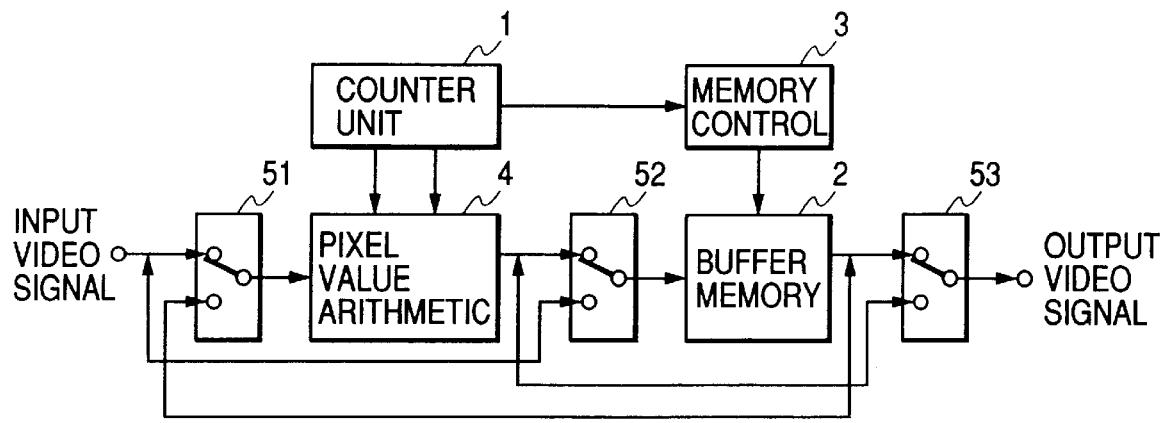
FIG. 1 is a block diagram for illustrating a resolution conversion unit.

FIG. 1 is a block diagram for illustrating a resolution conversion apparatus in accordance with the first embodiment of the present invention.

The present embodiment functions for both enlargement and reduction of the image, and the signal path can be switched depending on the function to be used, namely enlargement or reduction, by use of selectors 51, 52, and 53.

First, the reduction of the image is described. In this case, the selectors 51, 52, and 53 are switched to the upper side. An input image signal is supplied to a pixel value arithmetic unit 4 by way of the selector 51. The pixel value arithmetic unit 4 performs arithmetic by use of one or more input pixel values to calculate an output pixel value. At that time, the calculation is performed by use of a count value Z and a set value M supplied from a counter unit 1. The pixel value arithmetic unit 4 is controlled by means of the control signal supplied from the counter unit 1.

The arithmetic result generated from the pixel value arithmetic unit 4 is stored temporarily in a buffer memory 2 by way of the selector 52. The reason is that the number of pixels of an output image is smaller than the number of pixels of an input image in the case of image reduction, that is, pixels are thinned, the output pixel value is generated intermittently, the output pixel value is stored temporarily in the buffer in order to supply output pixel values, which have been generated intermittently, smoothly with a constant interval.

The buffer memory 2 is controlled by means of the control signal including the address, write enable, and read enable supplied from the memory control unit 3. Furthermore, a memory control unit 3 itself is controlled by means of the control signal generated from the counter unit 1.

It is made possible that the pixel value arithmetic unit 4 and the buffer memory 2 are operated cooperatively because the counter unit 1 controls these components.

Finally, the output pixel value stored in the buffer memory 2 comes out from the resolution conversion apparatus by way of the selector 53 as a resolution-converted output video signal.

Next, an example in which an image is enlarged is described. In this case, the selectors 51, 52, and 53 are switched to the lower side. An input video signal is stored temporarily in the buffer memory 2 by way of the selector 52. The reason is that because it is required to increase the number of pixels of an output image in comparison with the number of pixels of an input image in the case of enlargement of an image and it is required to supply output pixel values smoothly with a certain interval corresponding to the format of the output video signal, such requirement is satisfied by storing the input image temporarily in the buffer memory to thereby use the input pixel values used for arithmetic as required.

The buffer memory 2 is controlled by means of the control signal from the memory control unit 3 including the address, write enable, and read enable as in the case of reduction. Furthermore, the memory control unit 3 itself is controlled by means of the control signal generated from the counter unit 1.

The input pixel value stored in the buffer memory 2 is supplied to the pixel value arithmetic unit 4 by way of the selector 51. The pixel value arithmetic unit 4 performs arithmetic by use of one or more input pixel values to calculate output pixel values. At that time, the pixel value arithmetic unit 4 calculates the output pixel values by use of the count value Z and set value M supplied from the counter unit 1. The pixel value arithmetic unit 4 is controlled by means of the control signal supplied from the counter unit 1.

Finally, the arithmetic result generated from the pixel value arithmetic unit 4 comes out from the resolution conversion apparatus as a resolution-converted output video signal by way of the selector 53.

Figure 2:
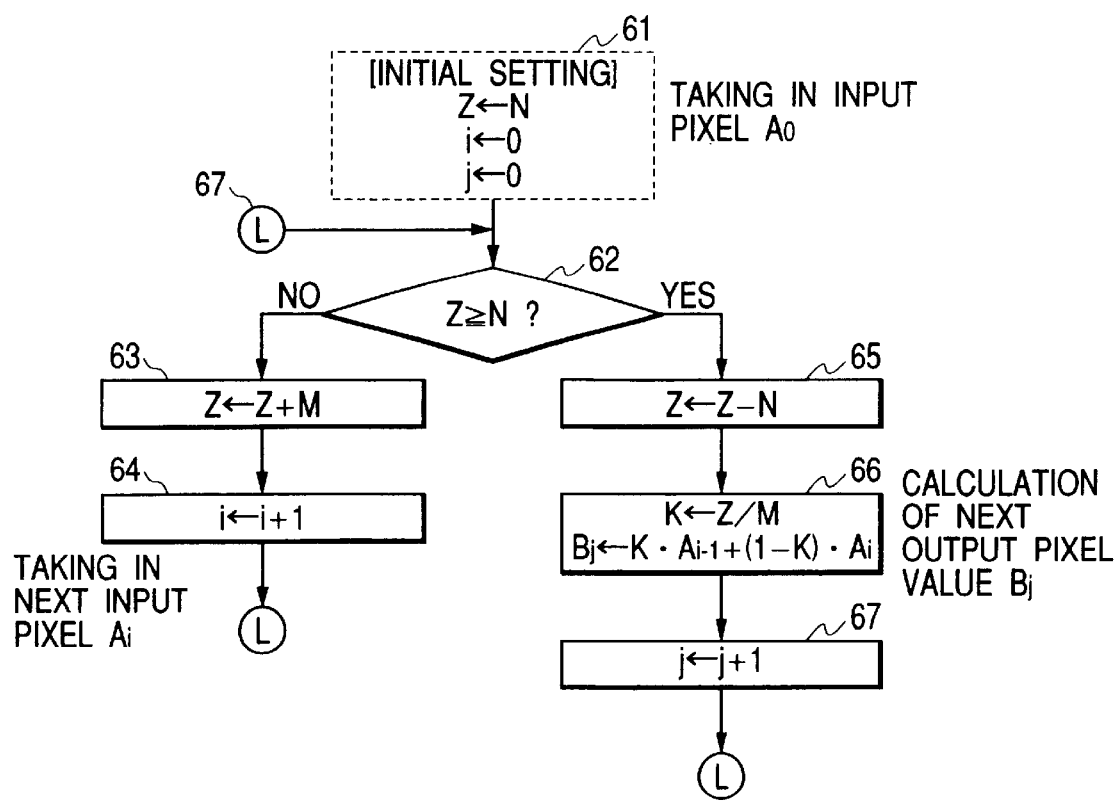
FIG. 2 is a flow chart for describing a resolution conversion algorithm.

FIG. 2 is a flow chart for describing the resolution conversion algorithm used for enlarging an input image to M/N times the original size in the present invention. Herein, M and N are positive integers respectively, $M \leq N$ means the reduction, and $M \geq N$ means the enlargement.

Figure 3:
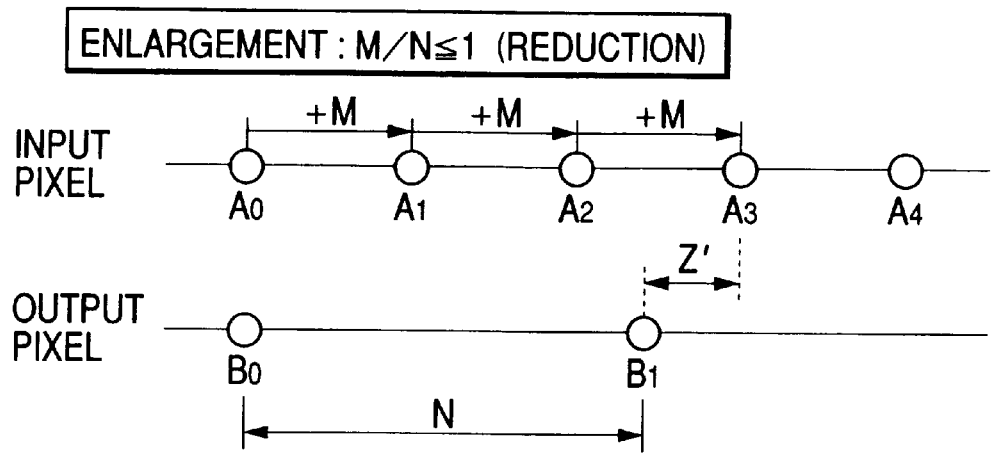
FIG. 3 is a diagram for describing the positional relation between the input pixel and output pixel in the case that the image size is reduced.

FIG. 3 is a diagram for describing the positional relation between input pixels and output pixels in the case of $M \leq N$, namely image reduction. The diagram is described herein under assuming that the input pixel and the output pixel are arranged in horizontal direction for convenience of description. As shown in FIG. 3, this resolution conversion involves the process for converting M input pixels to N output pixels. In terms of spatial expression of the interval between pixels, the interval M between the input pixel $A_i$ and $A_{i+1}$ is converted to the interval N between the output pixel $B_j$ and $B_{j+1}$.

In FIG. 3, for example, the output pixel value B1 is calculated by means of linear interpolation corresponding to the distance between B1 and A2 and the distance between B1 and A3 by use of A2 and A3, which are input pixel values near the output pixel value B1. To calculate an output pixel value $B_j$ actually by means of linear interpolation, it is required to obtain two information values described herein under.

One is what information is to be used in order to calculate an output pixel value $B_j$. In other words, both input pixels $A_i$ and $A_{i+1}$ located respectively on the right and left of the output pixel $B_j$ must be specified. Further in other words, the timing to calculate the output pixel value is obtained.

The other is the distance information between $B_j$ and $A_i$ and the distance information between $B_j$ and $A_{i+1}$. The value of $B_j$ is calculated by means of weighting corresponding to the distance.

FIG. 2 shows an algorithm for obtaining the above-mentioned two information values automatically.

A numeral 62 in FIG. 2 is a process for determining the timing when the output pixel value is calculated, and the process 63 and the process 65 in FIG. 2 are processes for performing the auxiliary calculation required to obtain the distance. A numeral 66 is a process for obtaining the actual output pixel value.

The variable Z is a variable for counting the distance between the preceding output pixel and the newest input pixel located on the right side. The two information values are calculated by use of the variable Z.

Variables i and j are the number of an input pixel and output pixel respectively. Variables $A_i$ and $B_j$ represent an input pixel value and output pixel value respectively. The variable K is a work variable used for linear interpolation calculation.

The resolution conversion algorithm according to the present invention in which an image is reduced is described with reference to FIG. 2 and FIG. 3.

First, as shown in the process 61 in FIG. 2, the count value Z=N, input pixel number i=0, and pixel number to be an output j=0 are set as the initial setting. The first input pixel A0 is read. The initial setting Z=N corresponds to the case in which the first input pixel A0 and the first output pixel B0 are located on the same position as shown in FIG. 3.

Next, whether $Z \geq N$ is checked in the process 62 in FIG. 2. In this case, the result is YES, and the sequence branches to the process 65 in FIG. 2. N is subtracted from Z, and in this case Z=0.

Furthermore, in the process 66 in FIG. 2, the coefficient K=0/M=0 is determined, and the next output pixel value B0 is calculated. In this case, because K=0, then B0=A0. The arithmetic result comes out from the pixel value arithmetic unit 4 as the first arithmetic output. Furthermore, as shown the process 67 in FIG. 2, the value of j is increased by 1, and becomes the value that indicates the next output pixel number (in this case, the value is 1).

After completion of the process, the sequence proceeds to the process 62 in FIG. 2 again, and whether $Z \geq N$ is checked. Because Z=0 this time, then the check result is No, and the sequence branches to the process 63 in FIG. 2. A that time, M is added to Z value, and then Z=M. Furthermore, in the process 64 in FIG. 2, the input pixel value number is increased by 1, and the next input pixel value A1 is supplied to the pixel value arithmetic unit 4.

Next, the sequence returns to the process 62 in FIG. 2 again, and the processes from the process 62 to the process 64 in FIG. 2 are repeated while Z<N is continuing.

For example, in the case that the relation between M and N is shown in FIG. 3, then Z=3M, and when the input pixel value A3 is read, $Z \geq N$ holds in the process 62 in FIG. 2, and the sequence branches to the process 65 in FIG. 2 on the right side again. At that time, N is subtracted from Z, and Z=3M-N. This value is represented by Z' in FIG. 3.

Next, the coefficient K=Z'/M is determined in the process 66 in FIG. 2. Furthermore, the next output pixel value BI is determined to be B1=K×A3+(1−K)×A2 by use of the input pixel values A3 and A2 located near B1. This arithmetic involves weighting by use of the reciprocal ratio of Z' and (M−Z') namely the distance between B1 and A3 and the distance between B1 and A2 respectively in FIG. 3. Because the reciprocal ratio is used, it is possible to apply the linear interpolation that the contribution from the input pixel located near is high depending on the distance.

The arithmetic result obtained as described herein above is generated from the pixel value arithmetic unit 4 as the second arithmetic output B1. Then, as shown the process 67 in FIG. 2, the value j is increased by 1, and the increased value is used as the value for indicating the next output pixel number (in this case, the value is 2).

By repeating the process, it is possible to reduce the image by use of the algorithm shown in FIG. 2 in the present invention.

A case in which first input pixel A0 and the first output pixel B0 are located at the same position as shown in FIG. 3 is described, but the present invention is by no means limited to such case. It is possible to set the starting phase of the output pixel value B0 desirably by selecting the initial setting Z value shown in FIG. 2 suitably.

Figure 4:
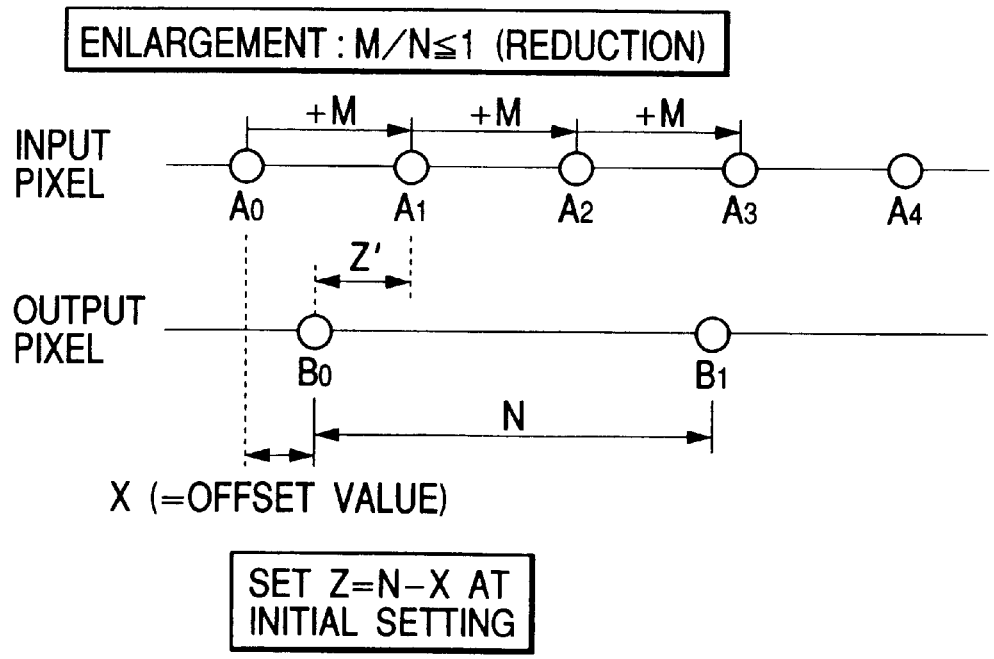
FIG. 4 is a diagram for describing the positional relation between the input pixel and output pixel in the case that the image size is reduced.

Such case is described with reference to FIG. 4. In FIG. 4, Z=N−X may be set in the initial setting of the process 61 shown in FIG. 2 in the case that the starting position of the output pixel B0 is set to the offset value represented by X. In this case, the check result for checking whether $Z \geq N$ is No in the process 62 in FIG. 2, and Z=N−X+M holds when the sequence proceeds by way of the process 63 and the process 64 in FIG. 2 and returns to the process 62 again, and reading of the next input pixel A1 has been completed. If X<M as shown in FIG. 4, then the check result for checking whether $Z \geq N$ is Yes at that time point, and the output pixel B0 is calculated by use of the input pixels A0 and A1. The following process is the same as that in the case shown in FIG. 3. On the other hand, if X>M, the position of B0 is shifted furthermore depending on the X value and the same process is repeated excepting that only the number of repetition of process 62 to the process 64 repeated until checking result for checking whether $Z \geq N$ becomes Yes first is different.

A case shown in FIG. 3 is regarded as the special case in which X=0 in FIG. 4.

Next, the resolution conversion algorithm of the present invention applied to enlarge an image is described with reference to FIG. 2 and FIG. 5.

First, as shown the process 61 in FIG. 2, the count value Z=N, input pixel number i=0, and pixel number to be generated next j=0 are set as the initial setting. The first input pixel A0 is read. The initial setting N=Z corresponds to the case that the first input pixel A0 and the first output pixel B0 are located at the same position as shown in FIG. 5.

Next, whether $Z \geq N$ is checked in the process 62 in FIG. 2. In this case, the check result is Yes, and the sequence branches to the process 65 in FIG. 2. Herein N is subtracted from Z, and in this case Z=0.

Furthermore, the coefficient K=0/M=0 is determined in the process 66 in FIG. 2, and the next output pixel value B0 is calculated. In this case, B0=A0 because K=0. This arithmetic result is generated from the pixel value arithmetic unit 4 as the first arithmetic output. As shown in the process 67 in FIG. 2 next, the value j is increased by 1, and the increased value is the value for indicating the next output pixel number (in this case, the value is 1).

After completion of the process, the sequence proceeds to the process 62 in FIG. 2 again, and whether $Z \geq N$ is checked. The check result is No this time because Z=0, and the sequence branches to the process 63 in FIG. 2. M is added to the value Z and Z=M holds. Furthermore, in the process 64 in FIG. 2, the input pixel value number is increased by 1, and the next input pixel value A1 is supplied to the pixel value arithmetic unit 4.

Next, the sequence returns to the process 62 in FIG. 2 again. For example, in the case that the relation between M and N is shown in FIG. 5, then Z=M and $Z \geq N$ holds at that time point, and the sequence branches right to the process 65 in FIG. 2 again. Herein N is subtracted from Z, and Z=M−N holds. This value is represented by Z' in FIG. 5.

Next, in the process 66 in FIG. 2, the coefficient is determined to be K=Z'/M. Furthermore, the next output pixel value B1 is calculated to be B1=K×A1+(1−K)×A0 by means of linear interpolation by use of input pixel values A1 and A0 located near B1.

The arithmetic result described herein above is generated from the pixel value arithmetic unit 4 as the arithmetic output B1. Then, the value j is increased by 1 as shown in the process 67 in FIG. 2, and the increased value is the value for indicating the next output pixel value number (in this case, the value is 2).

Next, at that time when the sequence returns to the process 62 in FIG. 2 again, because Z≧N holds still, the sequence branches right again, the output pixel value B2 is calculated and generated through the process 65 and the process 66 in FIG. 2. The process from the process 62 to the process 66 in FIG. 2 is repeated while Z≧N is being maintained.

Figure 5:
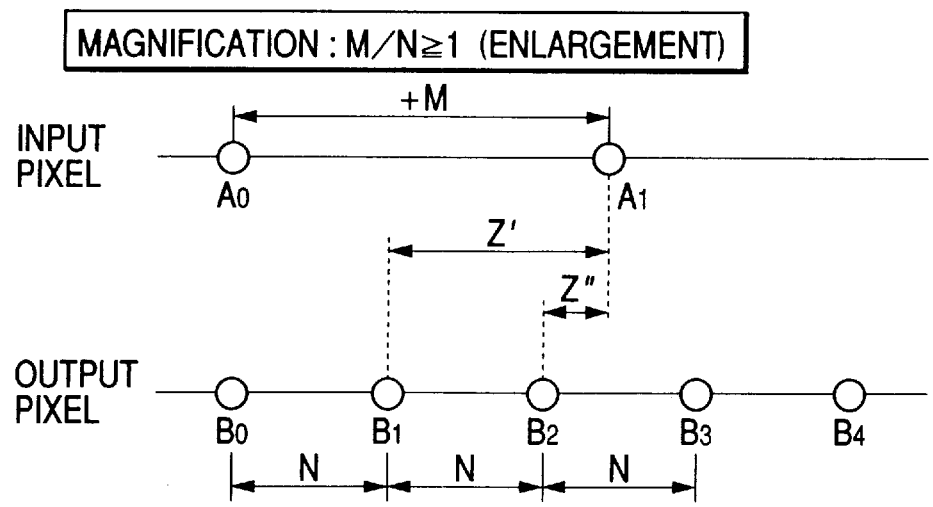
FIG. 5 is a diagram for describing the positional relation between the input pixel and output pixel in the case that the image size is enlarged.

For example, the relation between M and N is shown in FIG. 5, at the time point when output of B2 is completed and the sequence returns to the process 62 in FIG. 2, Z=M−2N (the value represented by Z" in FIG. 5) and Z<N hold, and the sequence branches to the process 63 in FIG. 2.

By repeating the process, it is possible to enlarge an image by use of the algorithm shown in FIG. 2 in the present invention.

It is possible to set an arbitrary offset value at the starting position of B0 in FIG. 5 as in the case shown in FIG. 4.

As shown herein above, both enlargement and reduction are performed by means of a systematic method by calculating using the variable Z in the same algorithm shown in FIG. 2 in the present invention.

Figure 6:
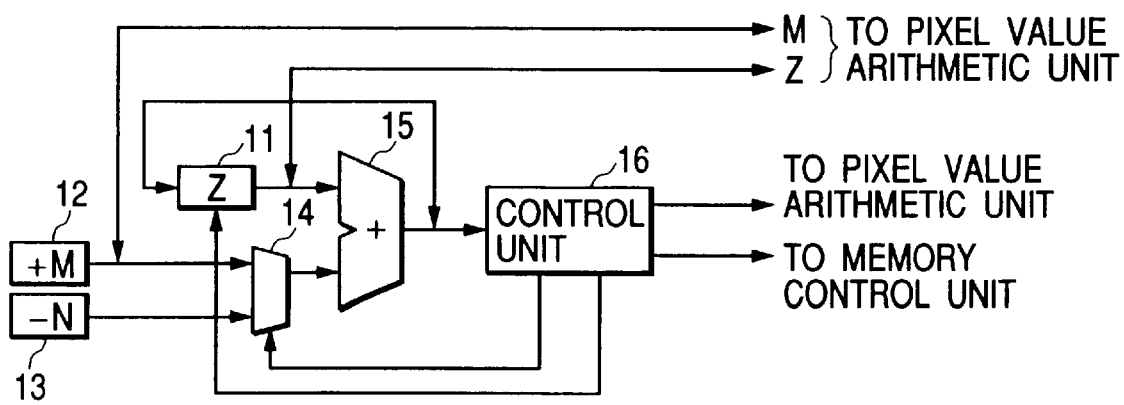
FIG. 6 is a block diagram of a counter unit.

FIG. 6 is a block diagram for illustrating the counter unit used in the present embodiment. In the present embodiment, a memory element 11 for storing the counter value Z, memory element 12 for storing the value M to set the magnification M/N, and a memory element 13 for storing the value −N are provided. The value to be stored in the memory elements 11, 12, and 13 can be set arbitrarily from the outside of the resolution conversion apparatus.

The outputs of the memory elements 12 and 13 are connected respectively to two input of the selector 14, and any one of these inputs is selected. The output of the selector 14 is supplied to any one of two inputs of an adder 15. The other input of the adder 15 is connected to the memory element 11. The output of the adder 15 is fed back to the memory element 11. It is possible to perform arithmetic of Z+M or Z−N in the adder 15 by switching the input of the selector 14 of the structure. As the result, the arithmetic of the process 63 and the process 65, which is required in the flow chart shown in FIG. 2 described herein above, is realized. Furthermore, it is possible to check whether Z≧N shown in the process 62 in FIG. 2 by checking whether the sign of the arithmetic result of Z−N is positive or negative.

The output of the adder 15 is supplied to an controller 16, and it is possible to switch the operation depending on the Z−N arithmetic result. The output of the controller 16 controls the switching control input of the selector 14 and controls the load enable input of the memory element 11. Furthermore, the output of the controller 16 controls the operation of the pixel value conversion unit 4 and memory control unit 3.

The counter value Z namely the output of the memory element 11 and the value M namely the output of the memory element 12 are supplied to the pixel value conversion unit 4, and used for arithmetic of the output pixel value.

The value −N is stored in the memory element 13 in the present embodiment, but the structure in which the value N is stored instead of −N and that value is subtracted in the adder 15 may be used, and the quite same function is realized in this case.

Figure 7:
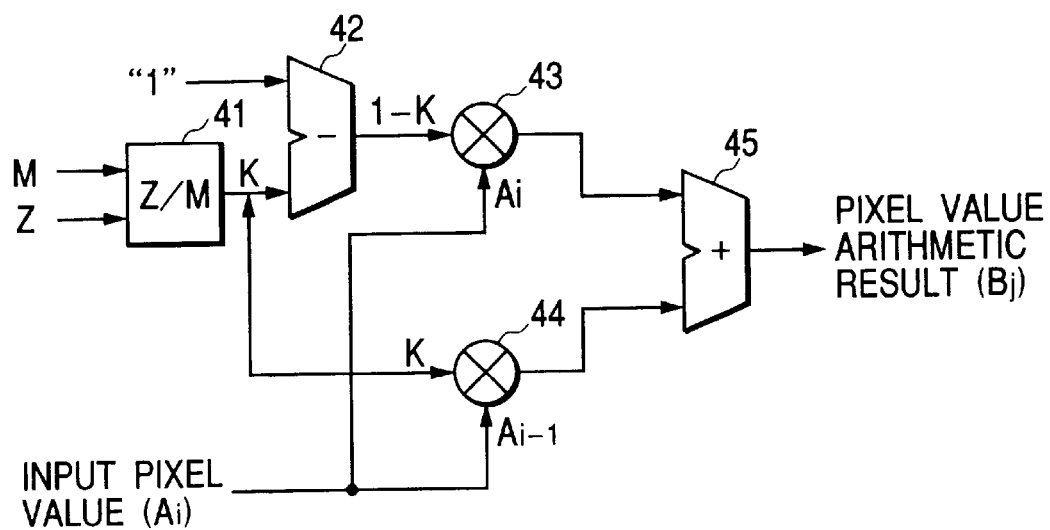
FIG. 7 is a block diagram of a pixel value arithmetic unit.

FIG. 7 is a block diagram of the pixel value arithmetic unit 4 used in the present embodiment. In a divider 41, Z is divided by M by use of the values Z and M supplied from the counter unit 1.

Next, arithmetic of 1−K is performed by use of K=Z/M namely the output from the divider 41 in a subtractor 42.

The product of 1−K namely the output of the subtracted 42 and the input pixel value Ai is obtained by a multiplier 43. The product of the output K of the diver 41 and the input pixel value Ai−1 is obtained by a multiplier 44.

The output from the multiplier 43 and the output from the multiplier 44 are added in an adder 45 to obtain the output pixel value Bj.

In the case that simultaneous multiplication by use of the multipliers 43 and 44 is not necessarily required, arithmetic may be performed one after the other by use of a single multiplier, and the multipliers 43 and 44 are unified commonly and the circuit scale can be reduced.

It is possible to enlarge and reduce an image in the horizontal direction according to the present embodiment by used of the structure described herein above.

It is possible to regard the pixel arrangement of the input and output pixels shown in FIG. 3, FIG. 4, and FIG. 5 as the arrangement in the vertical direction. In this case, the right direction in the above-mentioned description is replaced by the down direction, and the same discussion can be applied to the vertical direction. It is possible to enlarge or reduce an image in the vertical direction by applying the present embodiment.

As described herein above, it is possible to enlarge or reduce an image, in other words to convert the resolution of an image, in the horizontal or vertical direction as desired by applying the present invention.

Figure 8:
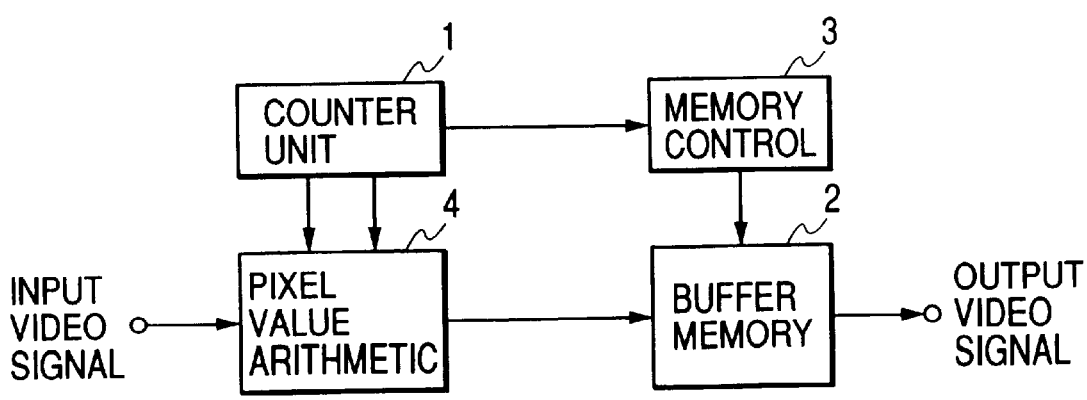
FIG. 8 is a block diagram of a resolution conversion unit.

Next, FIG. 8 shows the second embodiment of the present invention. This embodiment is equivalent to the case in which the selectors 51, 52, and 53 shown in FIG. 1 are set fixedly to the side as shown in FIG. 1. As described herein, it is possible to provide an exclusive reduction function. Other structures are the same as those shown in the first embodiment, and the detailed description is omitted.

Figure 9:
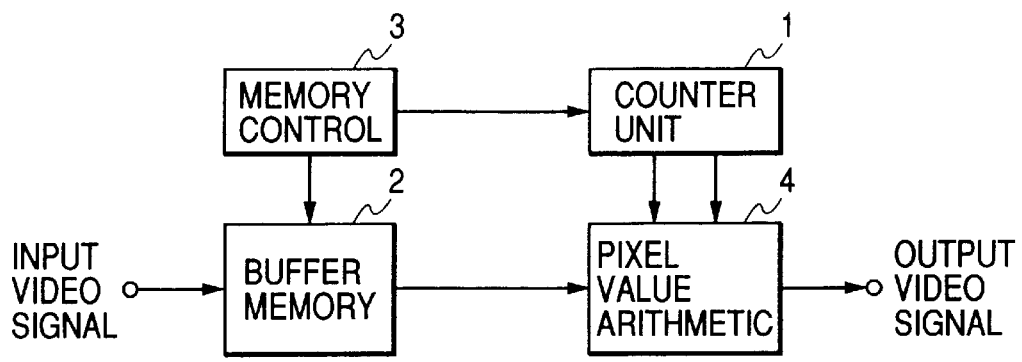
FIG. 9 is a block diagram of a resolution conversion unit.

Next, the third embodiment of the present invention is shown in FIG. 9. This embodiment is equivalent to the case in which the selectors 51, 52, and 53 shown in FIG. 1 are set fixedly to the side opposite to the side shown in FIG. 9. It is possible to provide an exclusive enlargement function. Other structures are the same as those shown in the first embodiment, and the detailed description is omitted.

Furthermore, it is possible to combine the second embodiment and the third embodiment. In detail, a selector for switching between the whole structure shown in FIG. 8 and the whole structure shown in FIG. 9 is provided to serve the same function as that shown in FIG. 1.

Next, the fourth embodiment of the present invention is described. This embodiment is equivalent to the case in which the value M to be set to the memory element 12 is limited to $2^k$ (k is an integer that is not negative) in the counter unit 1 shown in FIG. 6 described in reference to the first embodiment. Though the value M is limited, the desired magnification α is approximated by M/N if a sufficiently large value is selected as the value M.

In this embodiment, the divider 41 in the pixel value arithmetic unit 4 shown in FIG. 7 can perform division by M by means of simple bit shift (Z is shifted to the right by k bits), a resolution conversion apparatus having a divider with reduced circuit scale is thereby realized.

Other structures are the same as those of the first embodiment, the detailed description is omitted.

Figure 10:
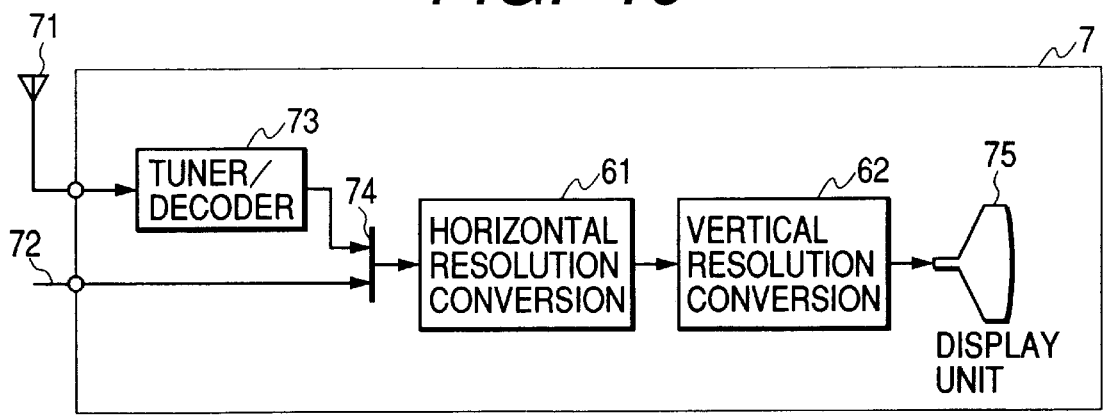
FIG. 10 is a block diagram of a television receiver having a built-in resolution conversion unit of the present invention.

Next, FIG. 10 shows the fifth embodiment of the present invention. This embodiment shows the resolution conversion apparatus incorporated in a television receiver 7. An antenna 71 receives the broadcast radio wave, and the video signal is demodulated by a tuner/decoder 73. It is possible to supply the video signal from the outside as required from the external input terminal 72. Any one of these video signals is selected by use of a selector 74, and the video signal is supplied to a horizontal resolution conversion unit 61.

The horizontal resolution conversion unit 61 is the resolution conversion apparatus described with reference to the first to fourth embodiments, and the resolution conversion unit 61 converts the resolution in horizontal direction. The output is supplied to a vertical resolution conversion unit 62.

The vertical resolution conversion unit 62 is the resolution conversion apparatus with reference to the first to fourth embodiments, and converts the resolution in the vertical direction.

As described herein above, the resolution is converted in horizontal direction and vertical direction, and the output is displayed as an image on a display unit 75.

Figure 11:
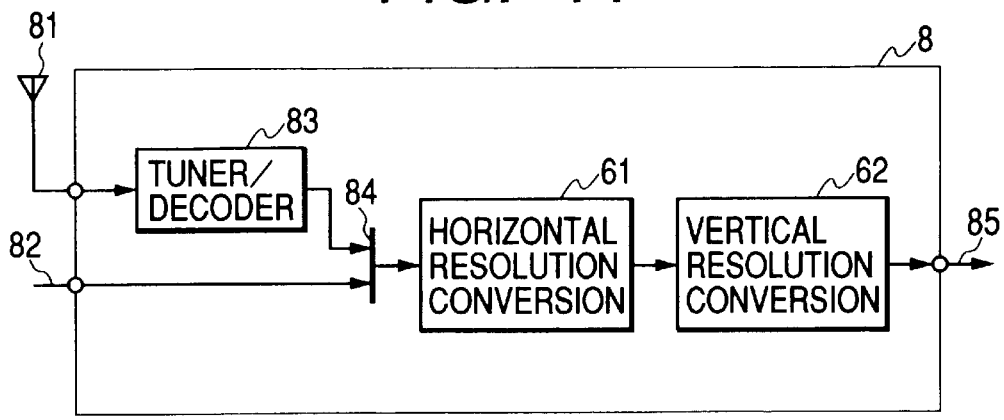
FIG. 11 is a block diagram of a set top box having a built-in resolution conversion unit of the present invention.

Next, FIG. 11 shows the sixth embodiment of the present invention. This embodiment is a set top box 8 having a built-in resolution conversion apparatus of the present invention. The signal supplied from an antenna 81 or an external input terminal 82 is subjected to resolution conversion in the horizontal direction and vertical direction in the same manner as used in the fifth embodiment. The output comes out from the external output terminal 85 as the output of the set top box 8.

Figure 12:
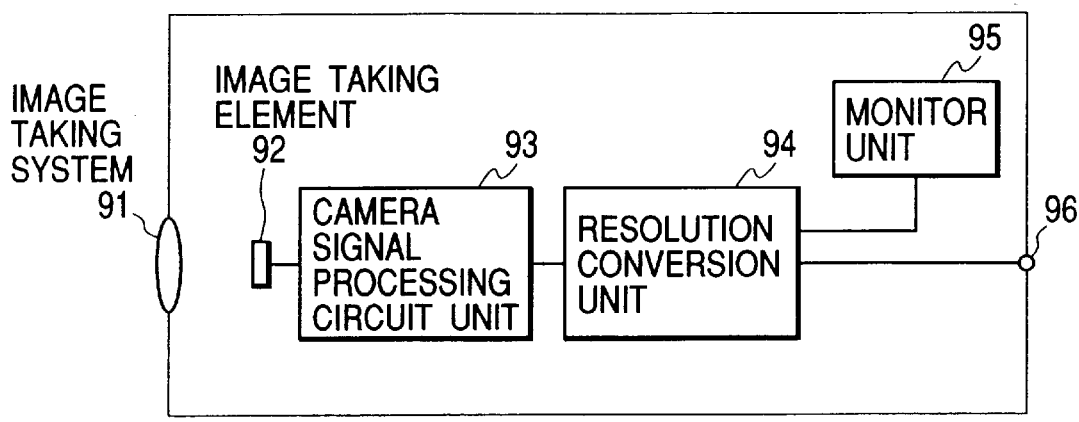
FIG. 12 is a block diagram of an image taking apparatus such as a camera having a built-in resolution conversion unit of the present invention.

Next, FIG. 12 shows the seventh embodiment of the present invention. In this embodiment, a resolution conversion apparatus of the present invention is incorporated in an image taking apparatus such as a camera. An image taken by an image taking system 91 of the image taking apparatus is converted to the video signal by an image taking element 92. The video signal is subjected to a predetermined process in a camera signal processing circuit unit 93, and then supplied to a resolution conversion unit 94. In the resolution conversion unit 94, the image from the camera operation unit not shown in the drawing is subjected to resolution conversion process by use of a process signal such as enlarging signal or reduction signal. For example, the image is electronically zoomed. The signal that has been subjected to resolution conversion is displayed on a monitor unit 95 of the camera or supplied to an output terminal 96.

Figure 13:
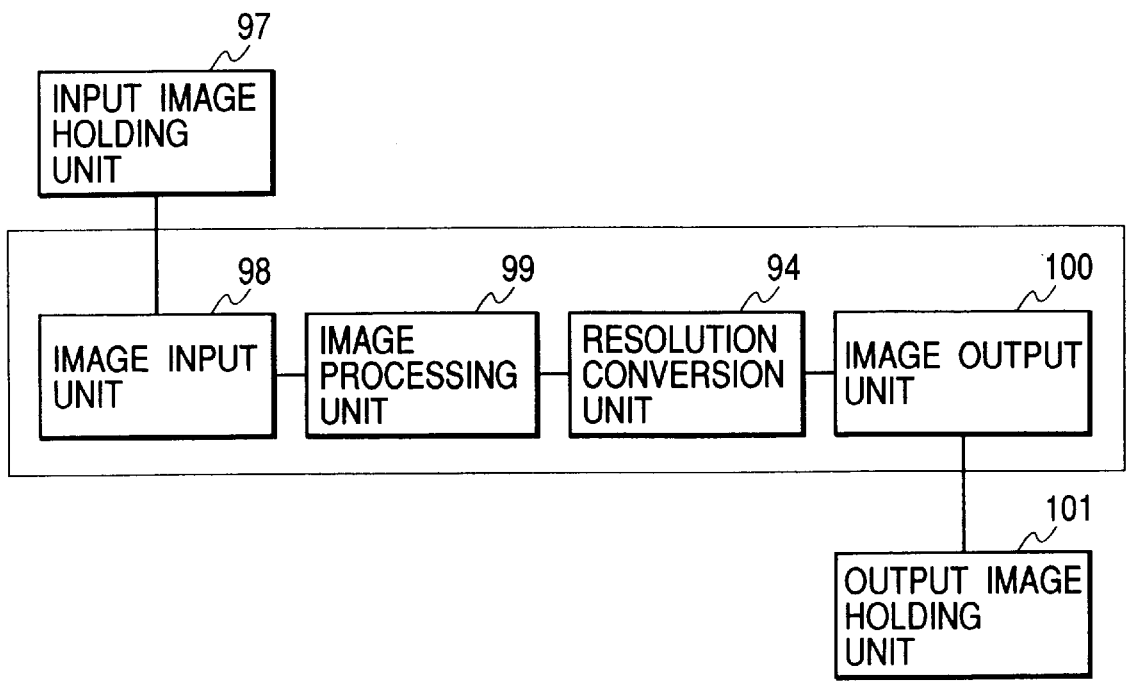
FIG. 13 is a block diagram of a copying machine having a built-in resolution conversion unit of the present invention.

Next, FIG. 13 shows the eighth embodiment of the present invention. This embodiment is a copy machine. having an incorporated resolution conversion unit of the present invention. An input image holding unit 97 holds an object to be copied. A image input unit 98 takes in an image of the object to be copied, and an image processing unit 99 processes the image. The processed image is transferred to a resolution conversion unit 94. The taken in image is subjected to enlargement process or reduction process herein. Though enlargement or reduction can be made by use of the image input unit, the image input unit is served as a camera usually and uses a zoom mechanism of the camera usually, and the mechanism is needed. On the other hand, if the resolution processing unit functions to enlarge or reduce the image, then only the signal processing is required and the mechanism is not needed. The image that has been subjected to enlargement/reduction process comes out from an output image holding unit 98 through an image output unit 100 in the form of a desired copy.

Figure 14:
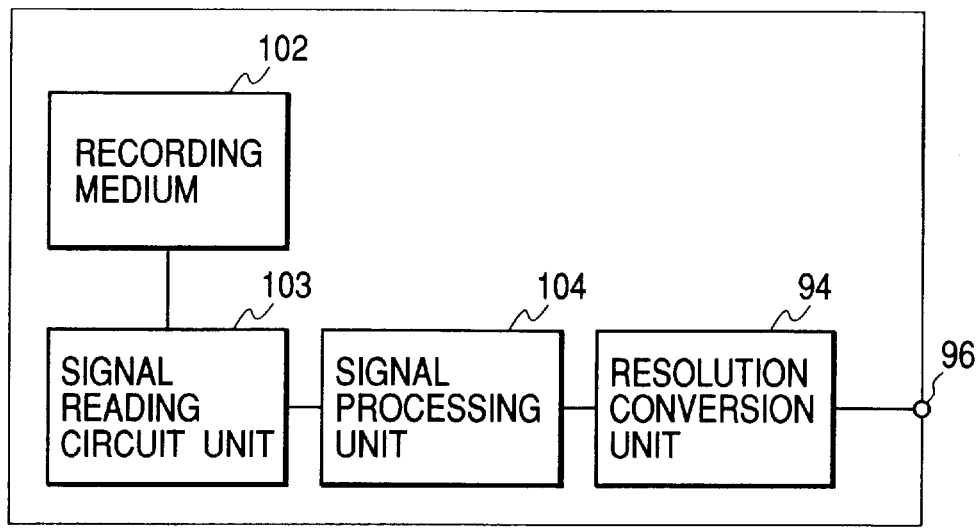
FIG. 14 is a block diagram of an apparatus for reproducing an image from a recording medium having a resolution conversion unit of the present invention.

Next, FIG. 14 shows the ninth embodiment of the present invention. This embodiment is an apparatus for reproducing the image from a recording medium such as DVD player or VTR in which a resolution conversion unit of the present invention is incorporated. An image signal recorded in a recording medium 102 is read out by means of an information reading circuit unit 103. After the image signal is subjected to a process by means of a signal processing unit 104, the resolution conversion unit 94 performs enlargement/reduction process, and the processed signal is supplied to an output terminal 96 as a signal to be supplied to a display unit such as a TV. Enlargement /reduction process is controlled by means of an operational signal supplied from the DVD player or the VTR. An image supplied from the recording medium is converted to an image of an arbitrary size.

Figure 15:
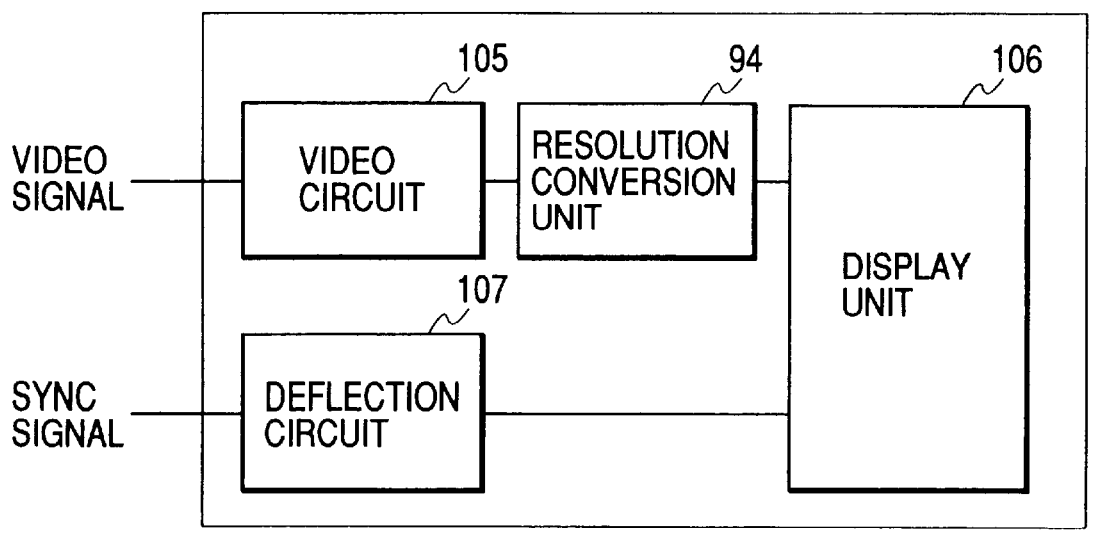
FIG. 15 is a block diagram of a monitor (display) having a built-in resolution conversion unit of the present invention.

Next, FIG. 15 show the tenth embodiment of the present invention. In this embodiment, a resolution conversion unit of the present invention is incorporated in a monitor (display). An video signal is supplied to a video circuit 105 and then subjected to enlargement/reduction process in a resolution conversion unit 94, and displayed on a display unit 106. The deflection circuit 107 processes the sync signal so that an image is displayed correctly.

As described hereinbefore, according to the present invention it is possible to provide a resolution conversion unit and an apparatus that is provided with the resolution conversion unit that are capable of realizing arbitrary enlargement/reduction process in the horizontal and vertical direction by use of a relatively simple and single hardware having the reduced circuit scale by means of application of the algorithm that is capable of performing enlargement/reduction process systematically according to the present invention.

What is claimed is:

1. A resolution conversion unit for converting resolution of a video signal from the number of input pixels N to the number of output pixels M, comprising:

an input part for receiving the video signal;

a first arithmetic part for adding a positive integer M to or for subtracting a positive integer N from a variable depending on the variable, and generating a result; and a second arithmetic part for operating the output pixel values based on the input pixel values of the video signal supplied to said input part and the result supplied from said first arithmetic part, and generating the video signal of the output pixel values.

2. A resolution conversion unit for converting resolution of a video signal from the number of input pixels N to the number of output pixels M, comprising:

a selection part for selecting one video signal from a plurality of video signals;

a first arithmetic part for adding a positive integer M to or for subtracting a positive integer N from a variable depending on the variable, and generating a result; and a second arithmetic part for operating output pixel values based on the input pixel values of the video signal supplied from said selection part and the result supplied from said first arithmetic part, and generating the video signal of the output pixel values.

3. A television receiver for displaying an image with converting resolution of a video signal from the number of input pixels N to the number of output pixels M, comprising:

a selection part for selecting one video signal from a plurality of video signals;

a first arithmetic part for adding a positive integer M to or for subtracting a positive integer N from a variable depending on the variable, and generating a result;

a second arithmetic part for operating the output pixel values based on the input pixel values of the video signal supplied from said selection part and the result supplied from said first arithmetic part, and generating the video signal of the output pixel values; and a display part for displaying the image based on the video signal supplied from said second arithmetic part.

4. An image taking apparatus for generating an image with converting resolution of a video signal from the number of input pixels N to the number of output pixels M, comprising:

an image taking part for taking the image and converting it to the video signal;

a first arithmetic part for adding a positive integer M to or for subtracting a positive integer N from a variable depending on the variable, and generating a result;

a second arithmetic part for operating the output pixel values based on the input pixel values of the video signal converted by said image taking part and the result supplied from said first arithmetic part, and generating the video signal of the output pixel values; and an output part for generating the image based on the video signal supplied from said second arithmetic part.

5. A copying machine for generating a copied image with converting resolution of a video signal from the number of input pixels N to the number of output pixels M, comprising:

an input part for taking in an image of a subject to be copied and generating an video signal;

a first arithmetic part for adding a positive integer M to or for subtracting a positive integer N from a variable depending on the variable, and generating a result;

a second arithmetic part for operating the output pixel values based on the input pixel values of the video signal supplied from said input part and the result supplied from said first arithmetic part, and generating the video signal of the output pixel values; and an output part for forming the copied image based on the video signal supplied from said second arithmetic part.

6. A recording/reproducing apparatus for generating an output image with converting resolution of a video signal from the number of input pixels N to the number of output pixels M, comprising:

a recording part for recording a video signal;

a first arithmetic part for adding a positive integer M to or for subtracting a positive integer N from a variable depending on the variable, and generating a result;

a second arithmetic part for operating the output pixel values based on the input pixel values of the video signal recorded by said recording part and the result supplied from said first arithmetic part, and generating the video signal of the output pixel values; and an output part for generating the output image based on the video signal supplied from said second arithmetic part.

7. A display apparatus for displaying an image with converting resolution of a video signal from the number of input pixels N to the number of output pixels M, comprising:

an input part for receiving an video signal;

a first arithmetic part for adding a positive integer M to or for subtracting a positive integer N from a variable depending on the variable, and generating a result;

a second arithmetic part for operating the output pixel values based on the input pixel values of the video signal received by said input part and the result supplied from said first arithmetic part, and generating the video signal of the output pixel values; and a display part for displaying the image based on the video signal supplied from said second arithmetic part.

8. An apparatus according to claim 1 or claim 3, wherein arithmetic of said output pixel values is performed by means of linear interpolation by use of said input pixel values.

9. An apparatus according to claim 1 or claim 3, wherein arithmetic of said output pixel values is performed based on timing information associated with said input pixels and the distance information associated with said input pixels.

10. An apparatus according to claim 1 or claim 3, wherein;

said positive integer M is an integer that is expressed in the form of $M=2^k$ wherein k is an integer that is not negative, said second arithmetic part has a dividing arithmetic part for dividing by M, and said dividing arithmetic part performs dividing by shifting an input value by k bits.

11. A resolution conversion unit for converting resolution of an input video signal with a magnification of M/N, comprising:

a storage part for storing an arithmetic result;

an arithmetic part including an adding unit for adding a positive integer M to an output of the storage part and a subtracting unit for subtracting a positive integer N from the output of the storage part;

a memory part for temporarily storing a video signal;

a memory control part for generating a reading and/or writing control signal based on an output supplied from the arithmetic part; and a pixel value arithmetic part for calculating an output pixel value corresponding to the pixel value included in the input video signal based on the output supplied from the arithmetic part.

12. A resolution conversion unit according to claim 11, wherein:

the integer M is equal to or smaller than the integer N;

the input video signal is supplied to the pixel value arithmetic part;

a video signal that is an output from the pixel value arithmetic part and includes an output pixel value is supplied to the memory part; and an output supplied from the pixel value arithmetic part is served as an output of the resolution conversion unit.

13. A resolution conversion unit according to claim 11, wherein:

the integer M is equal to or larger than the integer N;

the input video signal is supplied to the memory part;

the video signal that is the output from the memory part and includes the pixel value included in the input video signal is supplied to the pixel value arithmetic part; and an output supplied from the pixel value arithmetic part is served as an output of the resolution conversion unit.

14. A resolution conversion unit according to claim 11, wherein:

a storage part for storing a value that is changeable from an outside of the unit is provided and the positive integers M and N are stored in the storage part, the resolution conversion unit comprises:

a first selection part for selecting either the input video signal or the output supplied from the pixel value arithmetic part and supplying it to the memory part;

a second selection part for selecting either the input video signal or the output supplied from the memory part and supplying it to the pixel value arithmetic part; and a third selection part for selecting either the output supplied from the pixel value arithmetic part or the output supplied from the memory part and then sending it out from the resolution conversion unit, in a case that the positive integer M is equal to or smaller than the positive integer N, the first selection part selectively supplies the output from the pixel value arithmetic part to the memory part, the second selection part selectively supplies the input video signal to the pixel value arithmetic part, and the third selection part selects the output supplied from the memory part and sends it out from the resolution conversion unit, and on the other hand in a case that the positive integer M is equal to or larger than the positive integer N, the first selection part selectively supplies the input video signal to the memory part, the second selection part selectively supplies the output from the memory part to the pixel value arithmetic part, and the third selection part selects the output supplied from the pixel value arithmetic part and sends it out from the resolution conversion unit.

15. A resolution conversion unit according to claim 11, wherein:

the positive integer M is an integer that is expressed in the form of $M=2^k$ wherein k is an integer that is not negative;

the pixel value arithmetic part is a pixel value arithmetic part having a dividing arithmetic part for dividing by M; and the dividing arithmetic part is a dividing arithmetic part for performing dividing by shifting an input value by k bits.

* * * * *